US006988803B2

(12) United States Patent
Maximus

(10) Patent No.: US 6,988,803 B2
(45) Date of Patent: Jan. 24, 2006

(54) METHOD FOR TRANSMITTING SIGNALS IN A PROJECTION SYSTEM AND PROJECTION SYSTEM WHICH APPLIES SUCH METHOD

(75) Inventor: Bart Maximus, Oudenaarde (BE)

(73) Assignee: BARCO, naamloze vennootschap, Kortrijk (BE)

(*) Notice: Subject to any disclaimer, the term of this patent is extended or adjusted under 35 U.S.C. 154(b) by 55 days.

(21) Appl. No.: 10/780,730

(22) Filed: Feb. 19, 2004

(65) Prior Publication Data

US 2004/0165153 A1 Aug. 26, 2004

Related U.S. Application Data

(60) Provisional application No. 60/448,496, filed on Feb. 21, 2003.

(51) Int. Cl.

| | |
|---|---|
| ***G03B 21/00*** | (2006.01) |
| ***G03B 21/14*** | (2006.01) |
| ***G03B 21/26*** | (2006.01) |
| ***G02F 1/1335*** | (2006.01) |
| ***G02B 27/22*** | (2006.01) |

(52) U.S. Cl. ............................. 353/20; 353/7; 353/31; 353/94; 349/9; 359/464

(58) Field of Classification Search .................. 353/20, 353/31, 94, 121, 122, 7, 82; 348/742, 743, 348/744; 349/5, 7, 8, 9; 359/245, 630, 464
See application file for complete search history.

(56) References Cited

U.S. PATENT DOCUMENTS

| | | | | |
|---|---|---|---|---|
| 5,564,810 | A * | 10/1996 | Larson | 353/8 |
| 6,473,240 | B1 * | 10/2002 | Dehmlow | 359/630 |
| 6,886,943 | B1 * | 5/2005 | Greenberg et al. | 353/94 |
| 6,899,429 | B2 * | 5/2005 | Hamada et al. | 353/20 |

* cited by examiner

*Primary Examiner*—Melissa Jan Koval
(74) *Attorney, Agent, or Firm*—Bacon & Thomas PLLC

(57) ABSTRACT

Method for transmitting signals in a projection system, including the step of transmitting signals (Ra, Ga, Ba and Rb, Gb, Bb) to two or more projection elements (6 and 7), which projection elements (6 and 7) each are used for projecting a plurality of colors, at least one of these projection elements (6 and 7) having a different polarization state for at least one of the colors projected by the respective projection element (6 and 7), characterized in that the signals (Ra, Ga, Ba and Rb, Gb, Bb), supplied to said projection elements (6 and 7) for one or more colors, are swapped in order to result in a desired polarization for each of the respective colors.

6 Claims, 3 Drawing Sheets

METHOD FOR TRANSMITTING SIGNALS IN A PROJECTION SYSTEM AND PROJECTION SYSTEM WHICH APPLIES SUCH METHOD

The benefit of the filing date of U.S. provisional application No. 60/448,496 filed on Feb. 21, 2003 is claimed.

BACKGROUND OF THE INVENTION

1. Field of the Invention

The present invention relates to a method for transmitting signals in a projection system.

More particularly, the present invention relates to a method for transmitting signals in a projection system, including the step of transmitting signals to two or more projection elements, which projection elements each are used for projecting a plurality of colors, at least one of these projection elements having a different polarization state for at least one of the colors projected by the respective projection element.

2. Discussion of the Related Art

Passive stereo projection is a known technique which can be used to create a stereo or a so-called 3D or stereoscopic image effect and which can, for instance, be implemented with at least two LCD or LCoS projectors.

In the known projection systems which are used to create such a passive stereo effect based on polarization, at least two projectors are set up in such a way that one of the projectors receives only the video signals with the images for the left eye, and a second projector receives the video signal with the images for the right eye, whereby said video signals contain the image information and consist of information for the red, green and blue color, which forms a colored image together.

When, for example, two projectors are used, both these projectors will project light with a different polarization state on preferably a non-depolarizing screen.

However, the polarization state of the three colors red, green and blue, which are projected by each individual projector, is the same for each color.

With a pair of glasses, equipped with substantially orthogonally polarized filters, respectively, one filter for the left eye and one filter for the right, the left eye will receive only the images from one projector, while the right eye will receive only the images from the other projector.

It is known that LCD or LCoS projectors, which are used for passive stereo projection, are equiped with extra optical elements in order to obtain that the light from one projector has an equal polarization state for the three colors red, green and blue.

The images for a single set of passive stereo projectors can be supplied via, on the one hand, a set of two passive stereo signals or, on the other hand, via a single active stereo signal.

In the first case of a set of two passive stereo signals, an image generator transmits, both the left image and the right image, via an individual electrical path to each one of the two projectors.

In the other case, a single active stereo signal is used, in which the left and right images follow each other in time, whereby one image contains a left and a right field and whereby the frequency of such a signal is twice as high as for a passive stereo signal, which is a single field image signal.

When such a single active stereo signal is used, in combination with a set of two passive stereo projectors, said active stereo signal has to be distributed to both of the projectors, whereby only the correct fields have to be extracted from the signal, for instance the left fields for the first projector and the right fields for the second projector.

This means that, in applications with N sets of two passive stereo projectors working together to provide a big compound image, 2N passive stereo signals or N active stereo signals have to be provided by one or more image generators.

A method is already known, which makes use of the above-mentioned technique, whereby the first projector has linearly polarized light with the same polarization direction for the three colors, and the second projector has also linearly polarized light for the three colors, but with a polarization direction which is, for instance, altered in such a way, that it will be substantially orthogonal to the polarization direction of the first projector. In this case, the change of the polarization direction can be realized by using a broadband halfwave retarder.

In a second known method, the polarization state of the three colors in the first projector is right-handed circular polarization, and the polarization state of the three colors in the second projector is left-handed circular polarization.

However, in most cases the light of the three colors of LCD and LCoS projectors does not have the same polarization state for each color, because this facilitates an efficient optical design of said LCD or LCoS projector.

For instance, often an SPS-type recombination cube is used, which causes the light of, for example, the green color to be differently polarized than the light of the red and blue color, moreover in this example of the SPS cube, the green light is orthogonally polarized with respect to the light from the red and blue color.

In this case special optical elements have to be integrated in the LCD projector or have to be added to the LCD projector to obtain a corresponding polarization state of the three colors.

A first optical element which may be integrated to this aim, is a so-called SSS-type recombination cube, where the polarization state of the light is equal in the three color channels.

A disadvantage of the implementation of such a SSS-type recombination cube, is that it is known to have a low output efficiency, for example the light output might drop with 20%.

A second optical element which may be implemented, is an extra polarizer, which is placed at an angle of 45 degrees, both with respect to, for the above-mentioned example, the S-polarization state of red and blue, and the P-polarization state of green.

It is known that the usage of such an extra polarizer leads to a reduction of the light output with at least 50%.

A third optical element which is used to obtain a corresponding polarization state of the three colors, is a color selective retarder, which can change the polarization state of one color with respect to the other colors.

A disadvantage of such color selective retarders, is that they consist of a large stack of optimized retarders, which also introduce an important loss of light.

SUMMARY OF THE INVENTION

The present invention aims therefore at providing a method for transmitting signals in a projection system which does not show the above-mentioned disadvantages.

To this aim, the invention relates to a method as described above, whereby the signals, supplied to said projection elements for one or more colors; are swapped in order to result in a desired polarization for each of the respective colors.

The main advantage of such a method is that it does not require an equal polarization state for the three colors of each of the passive stereo LCD or LCoS projectors inside a passive stereo projection set, and therefore no special optical elements, which result in a loss of light, need to be implemented.

Moreover, this method can be used in combination with image generators generating passive stereo signals and with image generators generating active stereo signals.

The present invention also relates to a projection system, which comprises electronic and optical devices which apply a method according to the invention.

BRIEF DESCRIPTION OF THE DRAWINGS

With the intention of better showing the characteristics of the invention, hereafter, as an example without any limitative character, some preferred applications of a method for transmitting signals in a projection system, according to the present invention are described, with reference to the accompanying drawings, wherein.

DESCRIPTION OF THE PREFERRED EMBODIMENT

Figure 1:
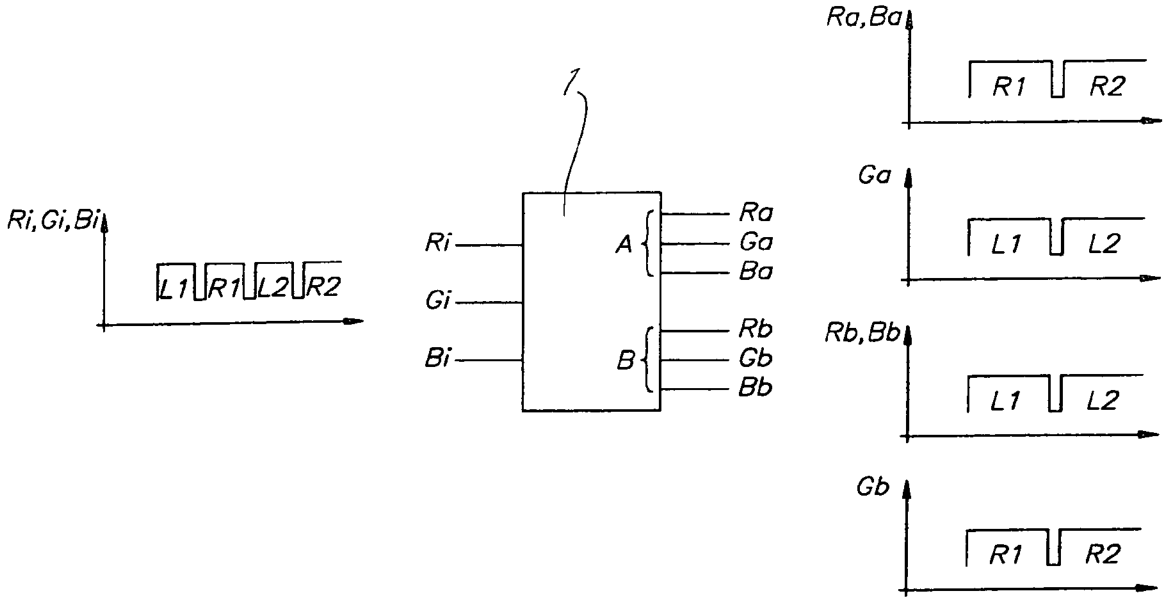
FIG. 1 schematically represents a synchronisation and color swapping unit, used in a method according to the invention.

FIG. 1 represents a synchronisation and color swapping unit 1, which is used in a method for transmitting signals in a projection system, according to the invention.

The input signal of said synchronisation and color swapping unit 1 consists of three active stereo signals Ri, Gi and Bi, respectively one signal for each of the colors red, green and blue.

Optional separate synchronisation signals like the Vertical Sync, Horizontal Sync or Composite Sync signals are not shown on the figures, since these synchronisation signals are considered to be embedded in the green signal (Sync On Red, Sync On Green or Sync On Blue). If the synchronisation signals are implemented separately and not embedded on one of the color signals, they should also be split and distributed to the projectors at the output, in the same way as the green signal, as described further in the text.

Said active stereo signals Ri, Gi and Bi consist of sequential frames L1-R1, in which every frame consists of two fields, more specifically a field containing the complete image for the left eye L1, and a field containing the complete image for the right eye R1.

The active stereo signals are split up in the signal synchronisation and color swapping unit 1, such that, for every color, the left field images L1 and L2 and the right field images R1 and R2 are sent to a separate output, such that the red, green and blue signals Ra, Ga, Ba, Rb, Gb and Bb at this output contain either only the information of the consecutive left fields, or only the information of the consecutive right fields.

As a result of this division, there are two sets of color signals, more specifically a first set of color signals Ra, Ga and Ba, which is sent to a first output channel A, and a second set of color signals Rb, Gb and Bb, which is sent to a second output channel B, whereby the period of each of said color signals Ra, Ga, Ba, Rb, Gb and Bb is twice as big as the period of the active stereo signals Ri, Gi and Bi, at the input.

This also means that these two sets of color signals Ra, Ga, Ba and Rb, Gb, Bb, are output at half the refresh frequency, also called the vertical frequency, of the input active stereo signals Ri, Gi and Bi.

In the example shown in FIG. 1, the green color signal Ga-Gb is swapped in the synchronisation and color swapping unit 1, according to the invention.

This means that, on the one hand, the green color signal Ga with the fields L1-L2 for the left eye, is output on the same output channel A, as the red and blue color signals Ra and Ba with the fields R1-R2 for the right eye.

On the other hand, the green color signal Gb with the fields R1-R2 for the right eye, is output on the same output channel B, as the red and blue color signals Rb and Bb, with the fields L1-L2 for the left eye.

Figure 2:
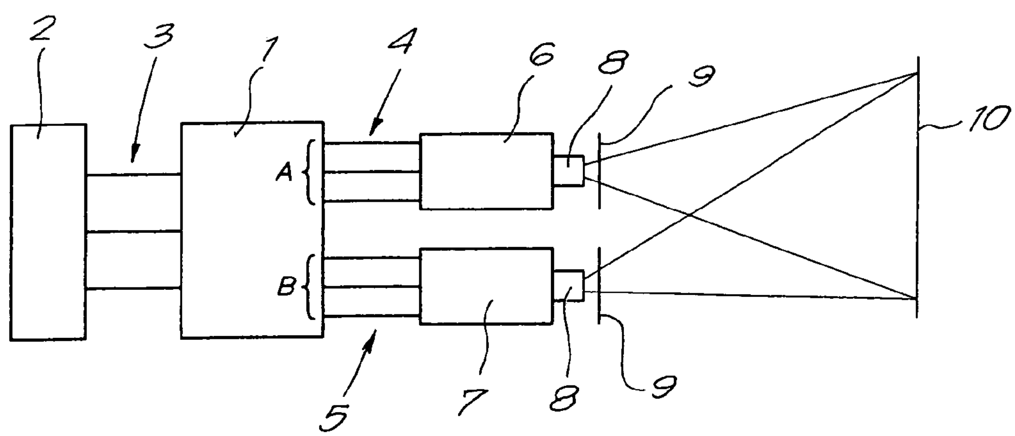
FIG. 2 schematically represents a projection system which makes use of the method according to the invention.

FIG. 2 shows a projection system, which mainly consists of an image generator 2, which is connected via a single output channel 3, to a signal synchronisation and color swapping unit 1, as described in FIG. 1.

The signal synchronisation and color swapping unit 1 is connected via two channels 4 and 5 to two respective projecting elements 6, 7 in the form of LCD or LCoS projectors, which are each equipped with a lens 8 and a retarder, more particularly, a retardation foil 9, which can be implemented inside of each projecting element 6 and 7, before the light goes through said lens 8, or outside the projecting elements 6 and 7, after the light has gone through the projection lens 8.

Said retardation foils 9 can be optically clear and are preferably equipped with the necessary antireflection coatings, so that they absorb or reflect only a very limited part of the light from the projecting elements 6 and 7.

The retardation foils 9 can be halfwave plates or quarterwave plates and need to be substantially broadband, in order to generate the same amount of polarization conversion on the three colors red, green and blue.

Further to the example of FIG. 1, the first set of color signals Ra, Ga and Ba, is sent to the first projecting element 6 and the second set of color signals Rb, Gb and Bb, is sent to the second projecting element 7.

After the color signals Ra, Ga, Ba and Rb, Gb, Bb have gone through the retardation foils 9, they are projected onto preferably a non-depolarizing screen 10.

Special care has to be taken that the color signals of the vertical, horizontal and/or composite synchronization are well synchronized between the original and the swapped color signals at the output, running at exactly half the frequency of the input signal. To achieve this, it is necessary to wait for at least one input field time period before the converted signal can be output.

If the left field L1 is sent first to the signal synchronisation and color swapping unit 1, it is necessary to at least wait for the arrival of the right field R1, before it is possible to process the right field R1 and start the output of the synchronized and color swapped left and right fields L1 and R1.

According to the invention, the color that will be swapped agrees to a color which has a different and preferably orthogonal polarization state in at least one of the projecting elements 6 and 7 that the signal is sent to.

In this case, the green color signal Ga-Gb will get a different polarization state in relation to the red and blue color signals Ra-Rb and Ba-Bb in the two projection elements 2.

It is clear that, in the case more than one color has a different polarization state in one or more of the projecting elements 6 and/or 7, it is possible to swap more than one color signal in the synchronisation and color swapping unit 1.

Figure 3:
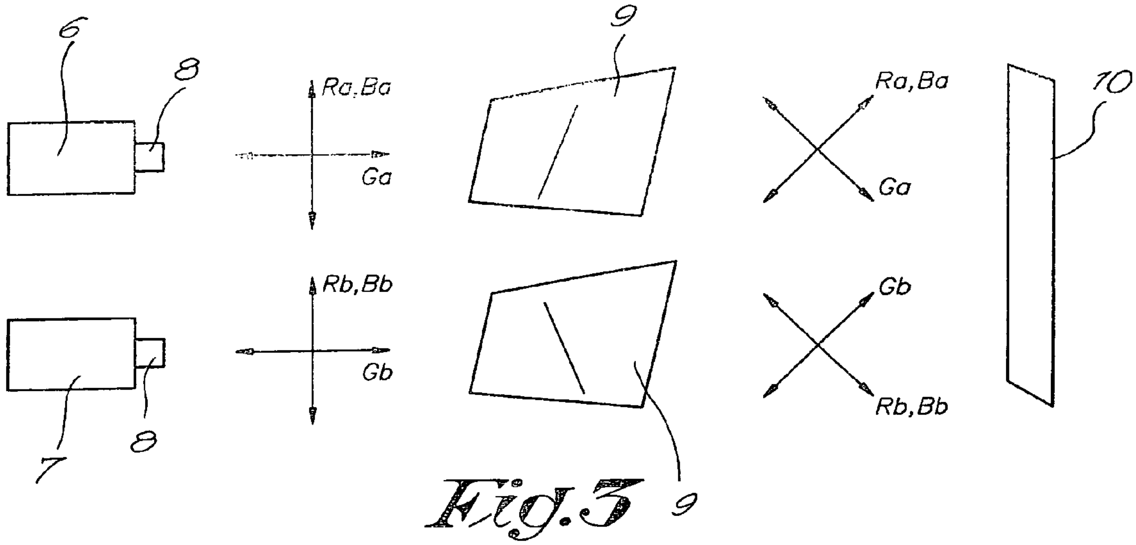
FIGS. 3 and 4 represent the use of retardation foils in a method according to the invention.

FIG. 3 represents the implementation of a pair of LCD projectors with a different linear polarization state of the green output channel, orthogonally to the polarization direction of the red and blue channel.

In order to make a rotation of a linear polarization state over a certain angle, a halfwave retarder has to be placed at an halfway angle between the source and destination angles.

In this case, the optical axis of the first broadband halfwave retardation foil 9 of the first projecting element 6 should be at 22.5 degrees clockwise compared to the vertical direction.

After said first retardation foil 9, the red and blue polarization state will be 45 degrees clockwise compared to the vertical direction, the polarization state of the green color will end up 45 degrees counterclockwise to the vertical direction.

The optical axis of the second broadband halfwave retardation foil 9 for the second projecting element 7 should be 22.5 degrees counterclockwise from the vertical direction.

After this second retardation foil 9 of the second projecting element 7 the red and blue polarization state will be 45 degrees counterclockwise to the vertical direction and the polarization state of the green color will end up 45 degrees clockwise to the vertical direction.

In this case, the pair of glasses which should be used, in order to obtain a stereo image effect, should contain linear polarizers.

The left and the right green color signals Ga and Gb, which are polarized orthogonally to, respectively, the polarization direction of the right and the left red and blue color signals Ra-Ba and Rb-Bb, are swapped inside the synchronisation and color swapping unit 1, as represented in FIG. 1.

With a suitable pair of glasses with orthogonally polarized filters, the left eye will only receive information intended for the left eye and the right eye will receive only information for the right eye, whereby each eye receives three color signals, respectively one color signal for each color.

Figure 4:
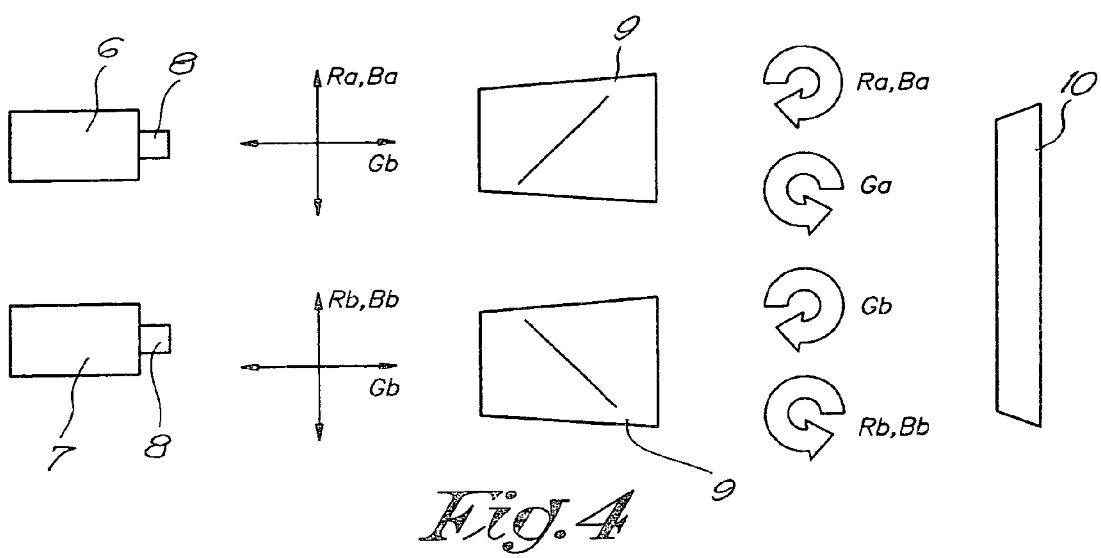

FIG. 4 shows a similar implementation of a pair of LCD projectors, whereby in this case the first retardation foil 9 leads to a right handed circular polarization state for the red and blue color signals Ra, Ba and a left handed circular polarization state for the green color signal Ga, and whereby the second retardation foil 9 leads to a left handed circular polarization state for the red and blue color signals Rb, Bb and a right circular polarization state for the green color signal Gb.

In this case the circular polarization can be realized with broadband quarterwave retardation foils 9 with optic axes lying at 45 degrees with respect to the vertical direction, as represented in the figure.

This requires the usage of a pair of glasses, containing circular polarizers, more in particular left-hand circularly polarized on one eye and right-hand circularly polarized on the other eye.

When using such an appropriate pair of glasses, the same result will be obtained as explained above and as shown in FIG. 3, wherein each eye receives all the information of every respective color.

Figure 5:
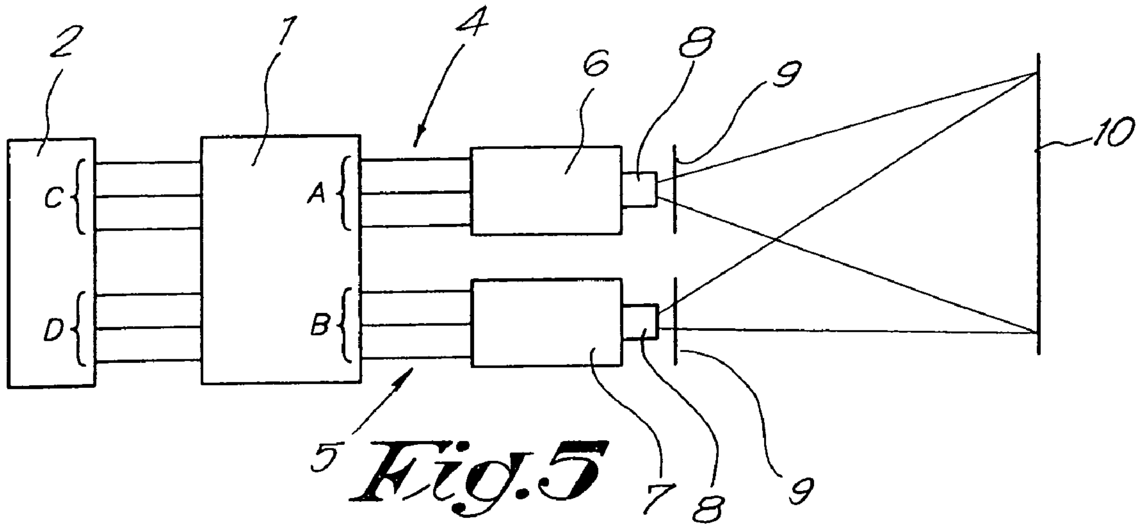
FIG. 5 schematically represents a projection system which makes use of a variant of the method according to the invention.

FIG. 5 represents a projection system similar to the one shown in FIG. 2, which uses a method for transmitting signals, wherein, in this case, two passive stereo signals are generated by the image generator 2 and wherein one signal contains the information for the left eye, and the other signal contains the information for the right eye.

It is clear that it is also possible that the left and right eye information can be generated by two independent image generators.

The image generator, which produces two passive stereo signals, contains two output channels C and D, which are both connected to a signal synchronisation and color swapping unit 1.

The purpose of this signal synchronisation and color swapping unit 1, is to, on the one hand, synchronize the two incoming signals, up to a level which is less than one pixel clock cycle difference and, on the other hand, to remove the possible jitter between the two signals.

The signal synchronisation circuit can for instance consist of a phase locked loop circuit, an analog to digital convector, and a digital delay system to match the two signals so that they are synchronized up to a level of one pixel clock cycle, and optionally a digital to analog converter if the projectors only accept an analog signal.

This is necessary to avoid that swapping colors between the images will lead to a jittering image with shifted colors because of the poor synchronisation.

It is clear that the above-mentioned digital delay system can be replaced with an analog delay system, in which case there is no need for an analog to digital converter and a digital to analog converter.

After synchronisation the necessary color signals are swapped between the two channels C and D, and are sent to the two output channels A and B of the signal synchronisation and color swapping unit 1.

All the color signals of the first channel A are transmitted to a first projector 6 and all the color signals of the second channel B are transmitted to a second projector B.

If, for example, the polarization state of the green color channel is different and orthogonally to the polarization state of the red and blue color channel, which is the case when using an SPS-cube, these outputs are connected to the passive stereo projectors as before, equipped with the same retardation foils, as explained in the case of the active stereo signal described above and shown in FIG. 3.

Figure 6:
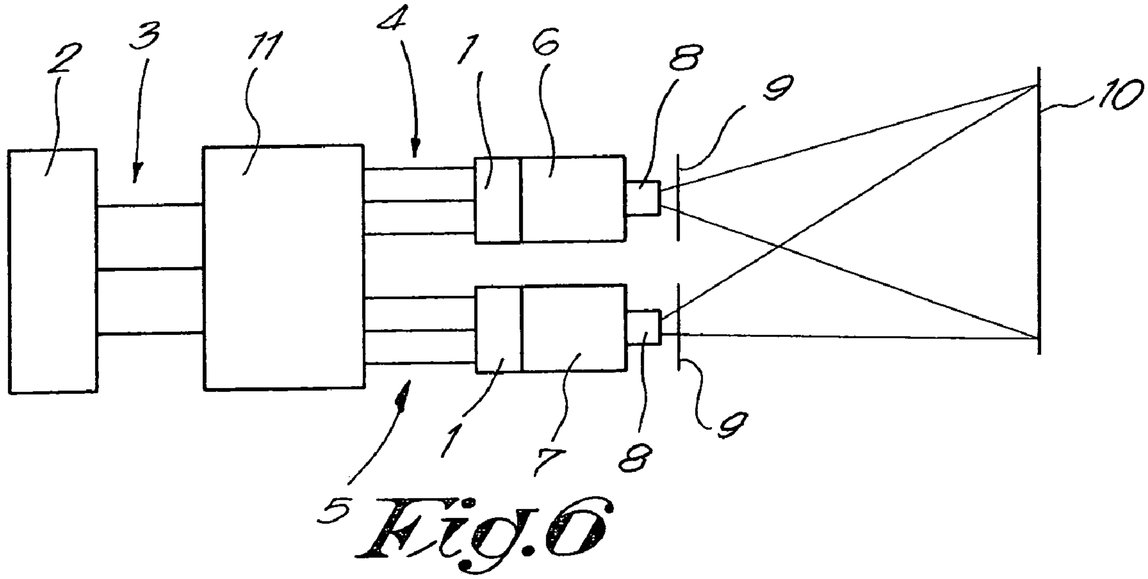
FIG. 6 schematically represents another embodiment of a projection system which makes use of the projection method according to the invention.

FIG. 6 represents a stereo projection system with an active stereo signal, wherein the active stereo signal is split to the two projectors 6 and 7, by using a signal splitter 11.

In this case the signal synchronisation and color swapping unit 1 is implemented inside the projecting elements 6 and 7, however, it is also possible to use an external synchronisation and color swapping unit 1, as represented in the FIGS. 2 and 5.

The described functionality of a signal synchronisation and color swapping unit on an active stereo signal can also be implemented in an active to passive converter.

It is necessary to have a very good synchronisation between the two output channels below the level of a pixel clock, and then to swap the wiring of the color outputs that need to be swapped between the output of the active to passive stereo converter and the projectors 6 and 7.

It is clear that said method for transmitting signals in a projection system, can also be applied in a system with LCoS projectors, which can also have different and mutually orthogonal polarization states for the three colors, or in a system which combines LCD and LCoS projectors.

It is also clear that it is possible that the blue or red color has a different polarization state in at least one of the projecting elements 6 and 7 and it is also possible that more than one color has a different polarization state in at least one of the projecting elements 6 and 7.

The present invention is in no way limited to the application in projection systems described above and represented in the drawings, but such a method for transmitting signals in a projection system may be applied in different projection systems, without departure from the scope of the invention.

What is claimed is:

1. A projection system comprising:

two or more LCD or LCoS projectors that have a different polarization state in one or two of the three colors red, green or blue:

at least one signal synchronization and colors swapping unit providing an output color signal to at least one of said projectors, wherein the color or colors having a different polarization state in said projectors are swapped; and a substantially broadband halfwave or quarterwave retarder foil applied inside or outside each of the LCD or LCoS projectors.

2. The projection system according to claim 1, further comprising an image generator which is connected to said at least one signal synchronization and color swapping unit.

3. The projection system according to claim 1, wherein each of said at least one signal synchronization and color swapping units is implemented inside a respective projector.

4. The projection system according to claim 2, wherein said image generator is connected to a single signal synchronization and color swapping unit via two output channels for transmitting two passive stereo signals which are generated by the image generator.

5. The projection system according to claim 2, wherein said image generator is connected to a single signal synchronization and color swapping unit via a single output channel for transmitting an active stereo signal.

6. The projection system according to claim 5, further comprising a signal splitter for splitting the active stereo signal, whereby said signal splitter is connected to said image generator via a single output channel and to each of said projectors via two channels.

* * * * *